(12) United States Patent
Gould

(10) Patent No.: US 6,224,799 B1
(45) Date of Patent: *May 1, 2001

US006224799B1

(54) METHOD FOR NEW ADDITIVE CONCENTRATES

(76) Inventor: John Gould, Barron Gould Studio, 5B Delancey Passage, Delancey Street, London NW1 7NN (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,681

(22) PCT Filed: Mar. 25, 1996

(86) PCT No.: PCT/GB96/00713

§ 371 Date: Sep. 19, 1997

§ 102(e) Date: Sep. 19, 1997

(87) PCT Pub. No.: WO96/30434

PCT Pub. Date: Oct. 3, 1996

(30) Foreign Application Priority Data

Mar. 24, 1995 (GB) .................................... 9506022
Nov. 30, 1995 (GB) .................................... 9524530

(51) Int. Cl.[7] ............................ B29C 43/20; B29C 70/60
(52) U.S. Cl. .................... 264/115; 264/118; 264/122; 264/134
(58) Field of Search ..................... 264/115, 245, 264/246, 109, 122, 123, 118, 134, 128, 73, 78

(56) References Cited

U.S. PATENT DOCUMENTS

| 3,503,922 | 3/1970 | Carton . | |
|---|---|---|---|
| 3,976,608 | 8/1976 | Buckler et al. . | |
| 4,086,297 | 4/1978 | Rei et al. . | |
| 4,946,641 | 8/1990 | Skinner . | |
| 5,035,932 | 7/1991 | Snell et al. . | |
| 5,100,600 | * 3/1992 | Keller et al. .......................... | 264/115 |
| 5,176,751 | 1/1993 | Findley . | |
| 5,187,202 | 2/1993 | Walkowski . | |
| 5,198,160 | * 3/1993 | Chiu ..................................... | 264/115 |
| 5,217,554 | * 6/1993 | Stroppiana ........................... | 264/115 |
| 5,411,691 | * 5/1995 | Hwang ................................. | 264/115 |
| 5,569,424 | * 10/1996 | Amour ................................. | 264/115 |
| 5,746,958 | * 5/1998 | Gustafsson et al. ................ | 264/115 |

FOREIGN PATENT DOCUMENTS

| 149372 | 7/1981 | (DE) . |
| 028205 | 5/1981 | (EP) . |
| 121308 | 10/1984 | (EP) . |
| 144511 | 6/1985 | (EP) . |
| 259960 | 3/1988 | (EP) . |
| 516499 | 12/1992 | (EP) . |
| 306977 | 2/1929 | (GB) . |
| 419445 | 11/1934 | (GB) . |
| 631945 | 11/1949 | (GB) . |
| 890731 | 3/1962 | (GB) . |
| 1044378 | 9/1966 | (GB) . |
| 1179445 | 1/1970 | (GB) . |
| 1575835 | 10/1980 | (GB) . |
| 2176492 | 12/1985 | (GB) . |
| 52-057249 | 5/1977 | (JP) . |
| 63-051459 | 3/1988 | (JP) . |
| 95/15353 | 6/1995 | (WO) . |

* cited by examiner

*Primary Examiner*—Angela Ortiz
(74) *Attorney, Agent, or Firm*—Quarles & Brady LLP

(57) ABSTRACT

The process for the manufacture of an additive concentrate which comprises particles of size from 5 microns to 10 mm and a binder including the steps of:

(a) mixing the particles and the binder in the dry state;

(b) pressing the resulting mixture, optionally with heat sufficient to soften the binder, but insufficient to form significant melting of the particles so as to form a coherent body; and (c) optionally comminuting the resulting body.

25 Claims, No Drawings

METHOD FOR NEW ADDITIVE CONCENTRATES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to the manufacture of additive concentrates, especially coloured additive concentrates, for use in the manufacture of thermoplastic articles.

Known colour concentrates consist of a polymer resin composition containing high concentrations of pigments or dyes which is usually in the form of pellets or in diced form. (See, for example, Modern Plastics, Mid-October 1991, pages 155, 156 and 158.) The concentrates can comprise relatively large particles, for example fibre in flock form or flake material such as mica. A fabricator can make products of desired colour and appearance in a simple and reproducible manner by blending a polymer resin, also known as a let-down resin, with a small proportion, for example up to about 4% by weight, of an additive concentrate, also known as a masterbatch. Processing is easier and less messy when masterbatch pellets are used rather than colourants or other additives in liquid or dry form. The use of masterbatches also facilitates handling during storage, transport and weighing. Such known concentrates are typically made by melt-compounding the colourant or other additive into the polymer resin carrier using an intensive mix such as a screw extruder, Banbury-type mixer or compounding mill. Colour concentrates typically comprise 50 to 80% by weight pigment or dye. Concentrates which comprise large particles generally contain lower concentrations because of compounding difficulties.

Thomas B Reeve, in an article entitled "Studies in Pigment Dispersion for Plastics" published in Plastics—Meeting Challenges of the Future, ANTEC '82, 40th Annual Technical Conference & Exhibition, San Francisco, Calif., May 10–13, 1982, pages 389–392 (RAPRA Abstract 229169), describes a process in which pigments, titanium dioxide and resin were dry-blended to produce a tint concentrate which was subsequently extrusion compounded to produce a colour concentrate. If the extrusion compounding step was omitted, colour strength development was considerably reduced and a much greater degree of specking was also observed.

U.S. Pat. No. 5,187,202 discloses a pelletised colour concentrate which comprises up to about 80% by weight of a thermoplastic polymer, at least about 5% and up to about 30% by weight of a cellulosic short fibre or flock, and up to about 10% by weight of at least one dispersant aid. The concentrate may be made by intimate mixing of the components in known types of high-shear mixer or extrusion equipment.

It is an object of the present invention to provide a method of producing additive concentrates which can comprise high levels of large particles, particularly in the form of fibres or flakes.

BRIEF SUMMARY OF THE INVENTION

According to the invention is provided a process for the manufacture of an additive colour concentrate which comprises shaped coloured particles of the additive, being fibres and/or flakes of size from 5 $\mu$m to 10 mm and a binder of a thermoplastic polymer or prepolymer or a wax including the steps of:

(a) mixing the particles of the additive and the binder in the dry state at ambient temperature;

(b) compacting the resulting mixture, optionally with heat sufficient to soften the binder, but insufficient to form significant melting of the particles so as to form a coherent body; and (c) optionally comminuting the resulting body.

The shaped particles in the additive concentrate produced by the present invention take the form of fibres, for example fibre flock, or flake, for example an organic flake material such as chopped or ground polymer based film such as viscose or other polymer or cross-linked polymer based film material or an inorganic material such as mica. The particles may all have substantially the same shape and size, or can be of different shapes and sizes. If flake particles are used, being a substantial proportion of the concentrate, it has been found desirable to incorporate a small proportion, for example 0.25 to 15, preferably 1 to 10, percent by weight, of particles in the form of fibres. They may all be of one colour and material or may be of different colours and/or materials or may be colourless or uncoloured i.e. natural. In one embodiment the concentrate comprises particles of at least 2 different colours. The additive concentrates are colour concentrates containing coloured, for example dyed or pigmented fibre, flock or flake.

It is preferred that substantially all the binder particles have a maximum dimension in the range 10 to 100 $\mu$m.

Preferred fibres may have a diameter in the range 5 $\mu$m to 60 $\mu$m, often 7 to 30 $\mu$m, and a length in the range 500 $\mu$m to 10 mm or 100 $\mu$m or 250 $\mu$m to 10 mm. Such fibres are commonly referred to as staple fibres, and may also be referred to as flock, particularly when they have a length below about 5 mm. Fibre flock may be prepared by cutting longer fibres to lengths of about 250 $\mu$m or above. Shorter flock may be prepared by grinding, for example cryogenic grinding. Preferred flakes may have a basis weight in the range 10 to 50 grams per square meter in the plane of the flake and maximum dimensions in the range 50 $\mu$m to 5 mm or 10 $\mu$m or 25 $\mu$m to 5 mm. Suitable flakes may be prepared for example by chopping, or grinding or shredding (including cryogenically grinding) a polymer film. It will be appreciated that the particles should desirably be of a shape and composition such that they do not damage the processing equipment, for example by abrasion. Accordingly, the use of glass flake may generally be less favoured as compared with glass fibre.

The shaped particles may consist essentially of a natural organic polymer, a synthetic organic polymer or glass. They may consist essentially of a natural polymer which has been processed, for example they may consist essentially of natural cellulose or cellulose in the form of regenerated viscose. Use of synthetic organic polymers or processed natural organic polymers may be preferred. Use of glass particles may alternatively be preferred in some applications. Examples of suitable types of glass include A-, C-, E- and S-glass. Each polymer particle usually contains a single type of polymer but may contain a mixture of more than one type of polymer. The particles within the blend may consist of the same or different types of polymer or polymer mixture. The material of the polymer particles should be chosen having regard to compatibility between this material and the binder in which the particles are to be incorporated. A specific type of polymer particle is unplasticised cellulose film, optionally pigmented, for example regenerated cellulose film such as that made by the viscose process, which has been reduced to the specified size and optionally dyed or pigmented.

The polymer particles are preferably both mechanically and thermally stable under the temperatures encountered during processing, in particular thermoplastic processing, so that they substantially retain their original shape and do not degrade during such processing. Deformation of the particles during processing may give rise to a streaky appearance in a plastics article made thereby. The polymer particles should remain individual and discrete during the production of the additive concentrate. The polymer may be a thermoplastic polymer provided that the particles do not undergo significant deformation during the pressing operation. It has been found that certain thermoplastic polymers, particularly semi-crystalline polymers, may be processed at above their glass transition temperatures without the occurrence of such deformation. Other thermoplastic polymers, particularly amorphous polymers, are preferably processed below their glass transition temperatures. The polymer may be crosslinked, and may be thermoset. The polymer may be a polymer which has inherent mechanical stability at temperatures up to the decomposition temperature of the polymer, this decomposition temperature being above the temperature encountered during pressing (with or without added heat). For example, the polymer may be cellulose, particularly regenerated viscose, or an acrylonitrile polymer or copolymer, particularly a copolymer containing at least 85 percent by weight acrylonitrile units. Alternative types of organic polymer which may be used include polyamides, for example 6:6 and 4:6 polyamides, polyesters, polyethylenes (such as high density or low density polyethylenes) and ethylene copolymers which may be cross-linked. The cross-linking of the polymer may be achieved by saline grafting or irradiation.

The polymer particles can be pigmented or dyed to selected colours. If a blend of polymer particles is used this blend may include a small proportion of white and/or black pigmented particles, for example matt pigmented fibres, in addition to the particles of distinct colours. Cellulose and acrylonitrile copolymers can also be used. Organic polymer particles are, of course, available in a wide and precisely controllable range of intense colours. The polymer particles may be pigmented or dyed during their manufacture, or may be dyed subsequent to their manufacture. Glass particles or glass fibres are available in a range of colours. The coloured polymer particles preferably exhibit good light fastness.

The shaped particles used in the present invention may alternatively be of a single colour but of different shapes. For example, the additive may comprise a mixture of fibres and flakes of the same or similar colours. Colourless polymer particles may also be used. Examples of such colourless particles include organic fibres such as viscose and acrylic fibres and glass fibres which contain neither dye nor pigment.

Apart from the shaped particles, the concentrates of the present invention may additionally comprise small proportions of one or more conventional pigments. The proportion of pigment is often preferably no more than about 5 percent by weight based on the weight of the shaped particles, including any pigment present, although higher proportions, for example in the range 5 to 10 percent, may be desirable in some applications. A preferred pigment is a white pigment such as titanium dioxide. The concentrates may additionally comprise small proportions of conventional dyes.

Other particles which may be used include mica flakes, quartz particles, short-cut carbon fibres, opalescent, pearlescent and fluorescent pigments, and metallic pigments and glass fibre.

The binder used in the present invention is generally a thermoplastic resin which serves to bind the shaped particles together. The binder is preferably readily miscible with the let-down resin. Indeed it is preferably the same as the let-down resin. This allows uniform dispersion of the particles. Examples of binders known generally from masterbatch technology include low density polyethylene, ethylene/vinyl acetate copolymers, polyvinylchloride and mineral waxes. Thus the binder is a thermoplastic polymer, preferably in the form of a small particulate (a precipitated powder), a thermoplastic precursor or a wax (for example polyethylene wax), for example as a powder. The resin or wax typically has a particle size from 10 to 100 $\mu$m, preferably 30 to 90 $\mu$m.

According to a preferred embodiment of the invention, when the additive is a material, for example in the form of a film or fibres, which is capable of being coated with a layer of binder, step (a) of the process of the invention is replaced by the steps of:

(i) at least partially coating the additive with the binder; and
(ii) comminuting the additive thus coated to provide fibre and/or flake particles of size from 5 micrometers to 10 mm.

The shaped particles thus produced by step (ii) are then treated according to steps (b) and (c) of the method of the invention in the normal way. This embodiment of the invention thus provides a preferred way of, in effect, mixing the particles with a binder.

An advantage of the preferred embodiment of the invention is that the application of a controlled layer of binder onto the surface of the additive prior to the comminuting eg. grinding stage will enhance the ability of the subsequent compaction process to "weld" the particles into a coherent body, reduce the overall quantity of binder required and dispense with the dry blending stage.

When the additive is in extrudable form, step (i) of the preferred embodiment may be carried out by co-extruding the additive and binder to form a coated film or fibre. Examples of extrudable materials, which in the industry may also be referred to as cast, which may be used as the additive include synthetic organic polymers or processed natural organic polymers for example thermoplastic polymers, acrylonitrile polymers or copolymers, polyamides, polyesters and ethylene copolymers.

Alternatively, if the additive is already in the form of a film or fibre, the coating step (i) may be carried out by depositing a coating of the binder on the surface of the film or fibre, for example by roller coating or spraying. Examples of suitable materials for the additive for use in the form of a film or fibre include any of those listed above as well as glass fibres and fibres of cellulose or regenerated viscose.

When the coated additive formed in step (i) of the preferred embodiment is in the form of a film, the film may have one layer of additive (a) and one layer of binder (b) or two layers of binder which may be described as (b-a-b). The thickness of the film of the additive is preferably from 10 to 250 $\mu$m. The diameter of the fibres of the additive is preferably from 5 to 250 $\mu$m. The thickness of the layer of binder applied to the additive is preferably from 0.5 to 25 $\mu$m.

When the additive concentrates comprise small proportions of conventional pigments and/or other particles, these may be added at various stages. For example they can be incorporated in the additive prior to extrusion or in the binder. Again, they can be dry-blended with the concentrate as in step (a).

The comminuting step (ii) of the preferred embodiment may be carried out by grinding to form flake shaped particles from film or short length staple particles from fibre. Alternatively particles may be produced by chopping or shredding. It is preferred that the process does not generate sufficient heat so as to soften the polymer or the binder. Accordingly cryogenic grinding, chopping or shredding is preferred.

An additive concentrate made by the process of the invention may comprise at least about 50 percent by weight of the shaped particles. It may comprise up to about 80 percent or up to about 90 percent by weight of these particles. Coloured additive concentrates containing such high levels of large particles are not generally available by other methods.

The mixing step (a) in the process of the invention may conveniently be performed in known types of equipment suitable for the purpose. The compacting (pressing) step (b) may be performed batchwise, for example between heated metal plates, which may be coated with a release agent. Thus a pellet, brickette or tablet can be formed by pressing the additive mixture in a mould. Alternatively, compression machinery whether of the geared or piston type, commonly used for the production of pharmaceutical pills and tablets can be used. The pressing step may alternatively be performed continuously or semi-continuously, for example by feeding the mixture in solid form in to the nip between heated rolls. Thus the mixture can be subjected to a ram press. The coherent body will then take the form of a rod or other shaped elongate body such as a sheet shaped body. The comminution step (c), if desired, may conveniently be performed by cutting or crushing the coherent body formed in the pressing step (b) into particles of similar size or bulk density, whichever is the more important, to the pellets, granules and the like conventionally used as feedstock in the plastics fabrication industry.

It will be appreciated that the application of pressure will tend to heat the binder thereby causing it to soften. If the binder does not soften or soften sufficiently in step (b) to form a coherent body with the particles then heat can be applied, typically, during pressing or just prior to pressing. Of course, the application of heat (and pressure) should be monitored to ensure that there is no appreciable melting, chemical degradation or irreversible mechanical damage to the particles, unless so required.

An additive concentrate made by the process of the invention may additionally comprise small amount of other substances in addition to the large particles, for example pigments, lubricants, antioxidants, UV stabilisers or other chemical or mechanical property promoters known to the plastics industry.

The process of the invention permits the simple manufacture of additive concentrates which contain high proportions of relatively large particles. This can be achieved imposing very low levels of shear on the particulate matter thereby enabling it to be available for the moulding machine in near pristine condition. Such colour concentrates are particularly suitable for use in the production of articles having a decorative visual finish described in WO95/15353.

DETAILED DESCRIPTION

The invention is illustrated by the following Example, in which parts and proportions are by weight:

EXAMPLE

Dry blends of viscose fibre flock (3.3 dtex, 0.5 mm staple, unpigmented) and ethylene vinyl acetate copolymer powder (EVA) (available under the Trade Mark MOWLITH DM200P from Hoechst Ag) were prepared. The blends were then compacted in the heated press at 150° C. for 5 minutes to form plaques of dimension approximately 10 cm×10 cm×4 mm. These plaques were cut up with scissors to prepare additive concentrates suitable for incorporation in plastics mouldings. Concentrates were prepared containing 50, 60, 70, 80 and 90% flock, the balance in each case being EVA. In all cases the compacted concentrates took the form of coherent, porous solids which could be broken up by hand. The plaque containing 60% flock was slightly flexible; the plaque containing 90% flock was more flexible, but tended to crumble.

The additive concentrates were mixed with polypropylene pellets to give mixtures containing 6% flock. These mixtures were extruded through a die at 220° C. to form films. Microscopic examination showed the fibre flock to be uniformly distributed with the film.

What is claimed is:

1. A process for the manufacture of an additive colour concentrate which comprises coloured fibers and/or flakes of the additive of size from 5 μm to 10 mm and a binder of a thermoplastic polymer or precursor or a wax including the steps of:
   (a) mixing the fibers and/or flakes of the additive and the binder in the dry state at ambient temperature;
   (b) compacting the resulting mixture, optionally with heat sufficient to soften the binder, but insufficient to form significant melting of, and insufficient to cause significant deformation of, the fibers and/or flakes, so as to form a coherent body; and
   (c) optionally comminuting the resulting body.

2. A process according to claim 1 wherein the binder is in the form of particles of size from 10 to 100 μm.

3. A process according to claim 1 wherein at least two different kinds of particle are used.

4. A process according to claim 1 wherein the particles comprise fibres having a length from 500 μm to 10 mm.

5. A process according to claim 1 wherein the particles comprise flakes having a maximum dimension from 10 μm to 5 mm.

6. A process according to claim 1 wherein the binder is a thermoplastic resin.

7. A process according to claim 1 wherein the concentrate contains at least 50% by weight of the particles.

8. A process according to claim 7 wherein the concentrate contains 50 to 80% by weight of the particles.

9. A process according to claim 7 wherein the concentrate contains 50 to 90% by weight of the particles.

10. A process according to claim 1 wherein step (b) is carried out between heated metal plates, by feeding the mixture in solid form between heated rolls or to a ram press.

11. A process according to claim 1 wherein the concentrate also contains a pigment in an amount up to 10% by weight.

12. A process for the manufacture of an additive colour concentrate which comprises coloured particles of an additive, and a binder of a thermoplastic polymer or precursor or a wax including the steps of:
   (i) at least partially coating the additive with the binder;
   (ii) comminuting the material thus coated to provide fibre and/or flake particles of size from 5 μm to 10 mm;
   (iii) compacting the comminuted material, optionally with heat sufficient to soften the binder, but insufficient to form significant melting of the particles, and insufficient to cause significant deformation of the particles, so as to form a coherent body; and
   (iv) optionally comminuting the resulting body.

13. A process according to claim 12 wherein step (i) comprises roller coating the additive with the binder.

14. A process according to claim 12 wherein the additive is initially in the form of a film and step (i) comprises coating the film on one side.

15. A process according to claim 12 wherein the additive is initially in the form of a film and step (i) comprises coating the film on both sides.

16. A process according to claim 12 wherein step (i) comprises co-extruding the additive and the binder.

17. A process according to claim 12 wherein at least two different kinds of particle are used.

18. A process according to claim 12 wherein the particles comprise fibres having a length from 500 µm to 10 mm.

19. A process according to claim 12 wherein the particles comprise flakes having a maximum dimension from 10 µm to 5 mm.

20. A process according to claim 12 wherein the binder is a thermoplastic resin.

21. A process according to claim 12 wherein the concentrate contains at least 50% by weight of the particles.

22. A process according to claim 21 wherein the concentrate contains 50 to 80% by weight of the particles.

23. A process according to claim 21 wherein the concentrate contains 50 to 90% by weight of the particles.

24. A process according to claim 12 wherein step (iii) is carried out between heated metal plates, by feeding the mixture in solid form between heated rolls or to a ram press.

25. A process according to claim 12 wherein the concentrate also contains a pigment in an amount up to 10% by weight.

* * * * *